Patented Mar. 16, 1954

2,672,461

UNITED STATES PATENT OFFICE 2,672,461

PREPARATION OF 2-PHENYL-3-PYRIDOL FROM 2-BENZOYLFURAN

Andrew P. Dunlop, Riverside, Ill., and Samuel Swadesh, Mill Valley, Calif., assignors to The Quaker Oats Company, Chicago, Ill., a corporation of New Jersey No Drawing. Original application August 11, 1950, Serial No. 178,998, now Patent No. 2,636,882, dated April 28, 1953. Divided and this application April 12, 1952, Serial No. 282,078

The portion of the term of the patent subsequent to April 28, 1970, has been disclaimed 6 Claims. (Cl. 260—297)

This invention relates to the preparation of 2-phenyl-3-pyridol from 2-benzoylfuran being a division of our copending application Serial No. 178,998, filed August 11, 1950 and now United States Patent No. 2,636,882, issued April 28, 1953.

One object of the present invention is to provide an efficient process for the preparation of 2-phenyl-3-pyridol. Another object is to provide a process for the preparation of 2-phenyl-3-pyridol in a direct manner which can be easily carried out using relatively inexpensive equipment. A very important object is to provide an improved process for producing 2-phenyl-3-pyridol by reacting 2-benzoylfuran with ammonia. Other objects and advantages of the present invention will become apparent to those skilled in the art as the invention is more fully described.

Broadly stated, the present invention provides an improved process for the production of 2-phenyl-3-pyridol which comprises heating 2-benzoylfuran with ammonia in the presence of a solvent which is a good ionic medium, preferably water or an alcohol or a mixture of the two at elevated temperatures. Suitable temperatures may vary from about 100° to 200° C., however, we generally prefer to operate within a temperature range of 120° to 180° C. It should be understood, however, that higher or lower temperatures may be used with a resultant increase or decrease in the reaction rate in accordance with the general law of chemical reactions.

The proportion of the reactants namely, 2-benzoylfuran and ammonia used in our process may be varied over a wide range. Theoretically, in our process one mole of 2-benzoylfuran reacts with one mole of ammonia in accordance with the following equation:

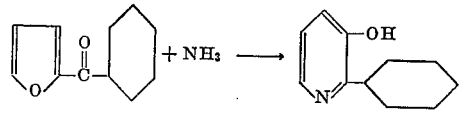

In practice, however, we prefer to employ an excess of ammonia.

The product of our invention has been characterized as a 3-pyridol by means of C, H, and N analysis, determination of neutral equivalent, by formation of the picrate derivative and by the fact that it produces a red color with FeCl$_3$, which is characteristic of a phenolic compound.

In order to disclose the nature of the present invention still more clearly, the following illustrative example will be given in which "parts by weight" bear the same relation to "parts by volume" as do grams to cubic centimeters.

EXAMPLE

*Preparation of 2-phenyl-3-pyridol*

To 25 parts by weight of 2-benzoylfuran were added 196 and 300 parts by volume of 28% ammonium hydroxide and methanol respectively. After heating the mixture for about 21 hours at a temperature of 150° to 160° C. in an autoclave, it was treated with 60 parts by weight of activated carbon in two equal increments and then concentrated at reduced pressure on a steam bath until crystal formation was observed, at the same time a small amount of dark oily liquid separated. The concentrated solution was cooled, a small amount of alcohol added to redissolve the oily liquid and then filtered. 16.1 parts by weight of 2-phenyl-3-pyridol M. P. 202.4° to 203° C. was obtained which represented a 65 per cent yield of theory. The picrate derivative after recrystallizing from alcohol had a melting point of 201.0° to 201.4° C.

| Analysis | C | H | N | Neutral Equivalent |
|---|---|---|---|---|
| C$_{11}$H$_9$ON: | | | | |
| Theory | 77.19 | 5.26 | 8.19 | 171. |
| Found | 77.48 | 5.21 | 8.12 | 205 as acid. 166 as base. |

Although the present invention has been described in conjunction with the preferred embodiment, it is to be understood that modifications and variations may be resorted to without departing from the spirit and scope of the invention, as those skilled in the art will readily understand. As for example, the use of activated carbon is not the only method of purification, but other purification methods can be used as will be apparent to those skilled in the art. Furthermore since its only purpose is as a purification agent and to facilitate the recovery

We claim:

1. A process for the production of 2-phenyl-3-pyridol which comprises reacting 2-benzoylfuran with ammonia at a temperature of 100–200° C. in the presence of a solvent selected from the class consisting of water, alcohol, and solutions of the same.

2. A process for the production of 2-phenyl-3-pyridol which comprises reacting 2-benzoylfuran with ammonia at a temperature of 120–180° C. in the presence of a solvent selected from the class consisting of water, alcohol, and solutions of the same.

3. A process for the production of 2-phenyl-3-pyridol which comprises reacting 2-benzoylfuran with ammonia at a temperature of 100–200° C. in the presence of alcohol as a solvent.

4. A process for the production of 2-phenyl-3-pyridol which comprises reacting 2-benzoylfuran with ammonia at a temperature of 100–200° C. in the presence of water as a solvent.

5. A process for the production of 2-phenyl-3-pyridol which comprises reacting 2-benzoylfuran with ammonia at a temperature of 120–180° C. in the presence of alcohol as a solvent.

6. A process for the production of 2-phenyl-3-pyridol which comprises reacting 2-benzoylfuran with ammonia at a temperature of 120–180° C. in the presence of water as a solvent.

ANDREW P. DUNLOP.
SAMUEL SWADESH.

References Cited in the file of this patent

UNITED STATES PATENTS

| Number | Name | Date |
|---|---|---|
| 2,636,882 | Dunlop et al. | Apr. 28, 1953 |